(12) United States Patent
Qiao et al.

(10) Patent No.: US 11,418,081 B2
(45) Date of Patent: Aug. 16, 2022

(54) MOTOR STATOR FOR COMPRESSOR, PERMANENT MAGNET MOTOR, AND COMPRESSOR

(71) Applicant: GUANGDONG MEIZHI COMPRESSOR CO., LTD., Guangdong (CN)

(72) Inventors: Zhengzhong Qiao, Guangdong (CN); Linshu Mao, Guangdong (CN); Xiaohua Qiu, Guangdong (CN); Yangbo Yu, Guangdong (CN)

(73) Assignee: GUANGDONG MEIZHI COMPRESSOR CO., LTD., Guangdon (CN)

( * ) Notice: Subject to any disclaimer, the term of this patent is extended or adjusted under 35 U.S.C. 154(b) by 212 days.

(21) Appl. No.: 16/618,232

(22) PCT Filed: Nov. 29, 2017

(86) PCT No.: PCT/CN2017/113645
§ 371 (c)(1),
(2) Date: Nov. 29, 2019

(87) PCT Pub. No.: WO2018/218899
PCT Pub. Date: Dec. 6, 2018

(65) Prior Publication Data
US 2020/0091789 A1    Mar. 19, 2020

(30) Foreign Application Priority Data

May 31, 2017 (CN) .......................... 201710400610.4
May 31, 2017 (CN) .......................... 201720625160.4

(51) Int. Cl.
*H02K 3/28* (2006.01)
*H02K 3/50* (2006.01)
(Continued)

(52) U.S. Cl.
CPC ............... *H02K 3/28* (2013.01); *H02K 1/165* (2013.01); *H02K 1/276* (2013.01); *H02K 3/12* (2013.01);
(Continued)

(58) Field of Classification Search
CPC .......... H02K 1/14; H02K 1/165; H02K 1/276; H02K 21/16; H02K 2213/03; H02K 3/12;
(Continued)

(56) References Cited

U.S. PATENT DOCUMENTS 4,675,591 A * 6/1987 Pleiss ........................ H02P 1/32
310/184
2007/0096571 A1* 5/2007 Yuratich ................ H02K 1/146
310/87
(Continued)

FOREIGN PATENT DOCUMENTS

CN        1556577 A    12/2004
CN      106300751 A     1/2017
(Continued)

OTHER PUBLICATIONS

Examination Report dated Jun. 10, 2020 received in Indian Patent Application No. IN 201927048676.
(Continued)

*Primary Examiner* — Alex W Mok
(74) *Attorney, Agent, or Firm* — Scully Scott Murphy & Presser

(57) ABSTRACT

A motor stator (11) for a compressor, a permanent magnet motor (10), and a compressor (A) are disclosed. The stator (11) includes: a stator core (111); a stator winding (112), the stator winding (112) including a plurality of coil groups, and each coil group having at least two connectors (1124); a lead-out wire (113) used to connect an external circuit and the stator winding (112), there being a plurality of lead-out
(Continued)

wires (113) and each lead-out wire (113) being connected to connectors of at least two different coil groups, wherein the rated voltage between terminals on which a motor is mounted is Un, the maximum outer diameter of the stator core (111) is Dmax, and the axial length of the stator core (111) is L, $U_n/(D_{max}^2 \times L) \leq 0.3$ V/cm³.

12 Claims, 8 Drawing Sheets

(51) Int. Cl.
  *H02K 7/14* (2006.01)
  *H02K 1/27* (2022.01)
  *H02K 1/16* (2006.01)
  *H02K 3/12* (2006.01)
  *H02K 3/48* (2006.01)
  *H02K 1/276* (2022.01)

(52) U.S. Cl.
  CPC ............. *H02K 3/48* (2013.01); *H02K 3/50* (2013.01); *H02K 7/14* (2013.01)

(58) Field of Classification Search
  CPC .. H02K 3/18; H02K 3/28; H02K 3/48; H02K 3/50; H02K 7/14; H02K 1/146; H02K 1/16; H02K 1/2706; H02K 3/522
  USPC .................................................. 310/216.001
  See application file for complete search history.

(56) References Cited

U.S. PATENT DOCUMENTS

| | | | | |
|---|---|---|---|---|
| 2007/0210656 | A1* | 9/2007 | Lafontaine | H02K 3/50 310/58 |
| 2007/0252447 | A1* | 11/2007 | Ionel | H02K 1/148 310/44 |
| 2009/0134734 | A1* | 5/2009 | Nashiki | H02K 19/103 310/162 |
| 2009/0212652 | A1* | 8/2009 | Nakamasu | H02K 1/276 310/156.53 |
| 2014/0346910 | A1* | 11/2014 | Nakano | B62D 5/0463 310/156.01 |
| 2016/0149453 | A1* | 5/2016 | Tanaka | H02K 3/38 310/71 |
| 2016/0197540 | A1* | 7/2016 | Shen | H02K 99/20 310/125 |
| 2016/0315510 | A1* | 10/2016 | Kawamata | H02K 21/24 |

FOREIGN PATENT DOCUMENTS

| | | |
|---|---|---|
| CN | 107017709 A | 8/2017 |
| EP | 1 028 047 A2 | 8/2000 |
| JP | 2005348522 A | 12/2005 |
| JP | 2008-223621 A | 9/2008 |
| JP | 2016-179536 A | 10/2016 |
| WO | 2017/042506 A1 | 3/2017 |

OTHER PUBLICATIONS

European Search Report dated May 12, 2020 received in European Patent Application No. EP 17911907.8.

Notice of Reasons for Refusal dated Dec. 1, 2020 received in Japanese Patent Application No. JP 2019-566349 together with an English language translation.

International Search Report dated Feb. 7, 2018, issued in PCT International Application No. PCT/CN2017/113645.

* cited by examiner

MOTOR STATOR FOR COMPRESSOR, PERMANENT MAGNET MOTOR, AND COMPRESSOR

FIELD

The present disclosure relates to a technical field of compressors, and more particularly, to a motor stator for a compressor, a permanent magnet motor, and a compressor.

BACKGROUND

Compressor motors typically couple phases in a star connection with a neutral point, rather than a polygonal connection without a neutral point. However, with the development of compressor technologies and the promotion of compressor applications, in some applications where the voltage is low or the motor volume is small, the motor has a high current, so in the related art, a large conductor area is required to ensure that the current density is within a reliable range, that is, stator windings usually adopt a conductor of a relatively large diameter or a plurality of conductors. However, the winding of a thick conductor or the simultaneous winding of a plurality of conductors is difficult, and cannot be mass-produced while ensuring reliability.

SUMMARY

The present disclosure aims to solve one of the technical problems in the related art to some extent. Accordingly, the present disclosure provides a motor stator for a compressor, and the motor stator is easy to process and manufacture.

The present disclosure further provides a permanent magnet motor having the above motor stator.

The present disclosure further provides a compressor having the above permanent magnet motor.

The motor stator according to embodiments of a first aspect of the present disclosure includes: a stator core having a plurality of stator teeth spaced along a circumferential direction of the stator core, any adjacent two stator teeth defining a stator slot; a stator winding wound around the stator teeth and including a plurality of coil groups, each coil group having at least two connectors; a lead-out wire used to couple an external circuit and the stator winding, a plurality of lead-out wires being provided, and each lead-out wire being coupled with at least two connectors from different coil groups, wherein a rated voltage between terminals on which a motor is mounted is Un, a maximum outer diameter of the stator core is Dmax, and an axial length of the stator core is L, $U_n/(D_{max}^2 \times L) \leq 0.3$ V/cm$^3$.

For the motor stator according to embodiments of the present disclosure, in a case where the terminal voltage of the motor, the maximum outer diameter and the axial length of the stator core satisfy the application range of the present disclosure, each lead-out wire is coupled to at least two connectors from different coil groups, such that the coil diameter of the stator winding can be decreased to improve the manufacturability of the stator winding and increase the space factor of the motor effectively, and at the same time, the AC resistance of the stator winding can be decreased to reduce the skin effect and improve the efficiency of the motor.

In an embodiment of the present disclosure, the number of the coil groups is equal to the number of the lead-out wires.

In an embodiment of the present disclosure, the stator winding includes a first coil group, a second coil group, and a third coil group, and three lead-out wires are provided.

Optionally, each of the coil groups has 2n connectors, n being a positive integer. A first lead-out wire is coupled to n connectors of the first coil group and n connectors of the second coil group; a second lead-out wire is coupled to other n connectors of the first coil group and n connectors of the third coil group; and a third lead-out wire is coupled to other n connectors of the second coil group and other n connectors of the third coil group.

In an embodiment of the present disclosure, the stator winding is a concentrated winding or a distributed winding.

In an embodiment of the present disclosure, the stator winding is coupled in a manner without any neutral point, which simplifies the connection process of the stator winding and the lead-out wires. On the premise of ensuring the same voltage and current characteristics of the motor, the coil diameter of the stator winding can be appropriately reduced, thereby improving the manufacturability of the stator winding to decrease the direct material cost and manufacturing cost of the stator winding, and also reducing the skin effect and lowering the AC resistance of the stator winding to enhance the efficiency of the motor.

In an embodiment of the present disclosure, the lead-out wire is coupled to the external circuit through a junction box or a conductive insert.

Optionally, the number of stator slots is a multiple of three.

The motor according to embodiments of a second aspect of the present disclosure includes: a rotor and a motor stator according to the above embodiments.

For the motor according to embodiments of the present disclosure, by adopting the motor stator according to the above embodiments, the processing and manufacturing becomes easy, the yield is high, the direct material cost and manufacturing cost of the motor can be decreased, and the motor efficiency can be improved.

In an embodiment of the present disclosure, the rotor includes: a rotor core having a plurality of magnet grooves; and a plurality of permanent magnets provided in the plurality of magnet grooves correspondingly. The number of pole pairs of the rotor is P, the number of stator slots is Z, and a relationship is satisfied: $Z/P=3/2^k$, wherein k is a positive integer.

Optionally, the permanent magnet motor is powered by a frequency converter.

The compressor according to embodiments of a third aspect of the present disclosure includes a permanent magnet motor according to the above embodiments.

For the compressor according to embodiments of the present disclosure, by adopting the permanent magnet motor according to the above embodiments, the cost performance of the compressor can be improved.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
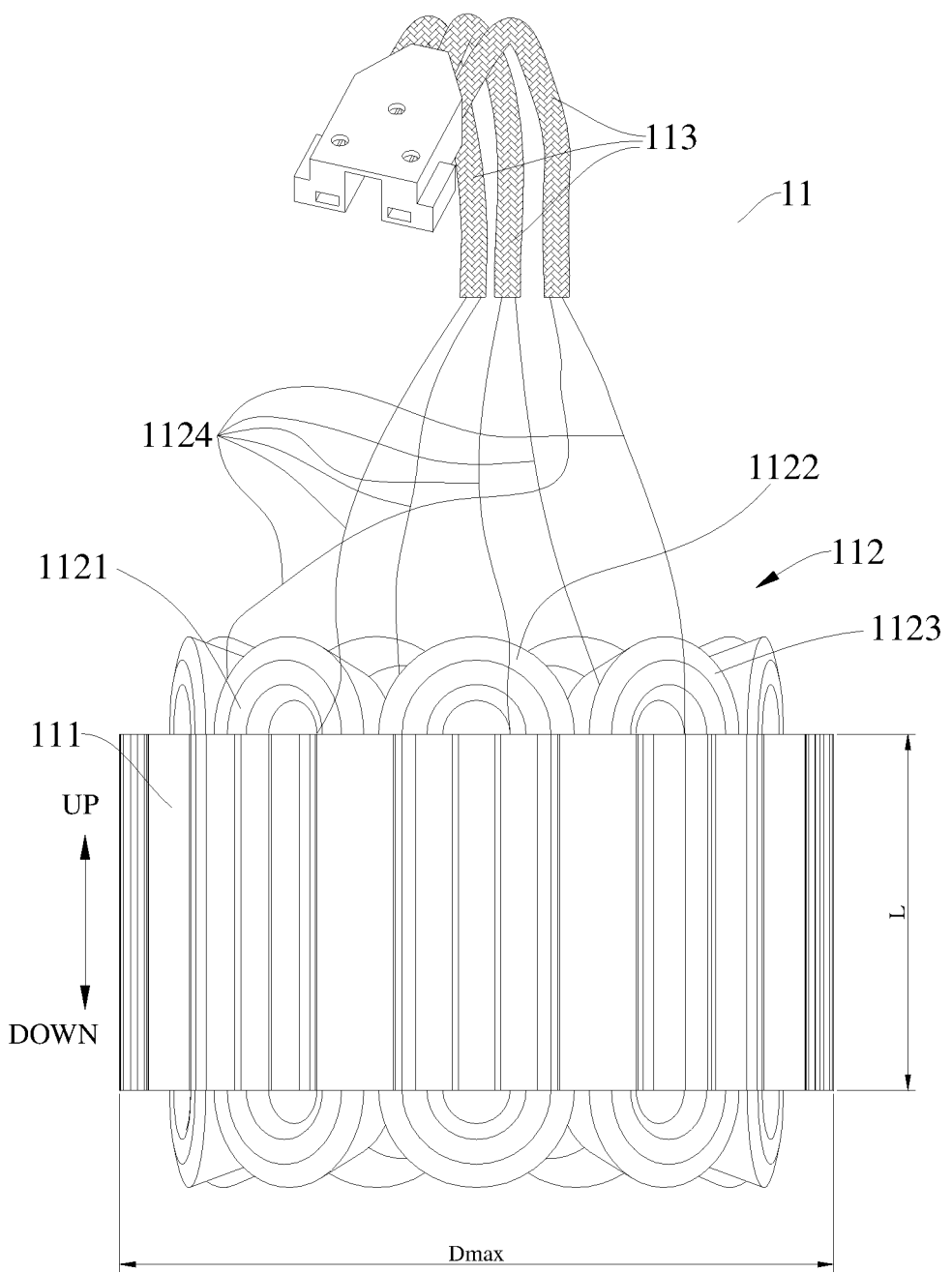
FIG. 1 illustrates a front view of a motor stator for a compressor according to an embodiment of the present disclosure.

REFERENCE NUMERALS compressor A,
permanent magnet motor 10,
stator 11,
stator core 111, passage 1111, stator tooth 1112, stator slot 1113,
stator winding 112, first coil group 1121, second coil group 1122, third coil group 1123, connector 1124,
lead-out wire 113,
rotor core 12, magnet groove 121, permanent magnet 13,
frequency converter 20, housing 30, crankshaft 40, cylinder 50, piston 60, main bearing 71, auxiliary bearing 72.

DETAILED DESCRIPTION

Embodiments of the present disclosure will be described in detail and examples of the embodiments will be illustrated in the drawings. The same or similar elements and the elements having same or similar functions are denoted by like reference numerals throughout the descriptions. The embodiments described herein with reference to drawings are explanatory, which are merely used to illustrate the present disclosure and shall not be construed to limit the present disclosure.

In the specification, it is to be understood that terms such as "central," "length," "width," "thickness," "upper," "lower," "front," "rear," "vertical," "horizontal," "top," "bottom," "inner," "outer," "axial," "radial," and "circumferential" should be construed to refer to the orientation as then described or as shown in the drawings under discussion. These relative terms are for convenience of description, and do not indicate or imply that the device or element referred to must have a particular orientation, or be constructed and operated in a particular orientation. Thus, these terms should not be constructed to limit the present disclosure. In addition, the feature defined with "first" and "second" may explicitly or implicitly comprises one or more of this feature. In the description of the present disclosure, the term "a plurality of" means two or more than two, unless specified otherwise.

A motor stator 11 for a compressor according to embodiments of a first aspect of the present disclosure will be described below with reference to FIGS. 1 to 5.

As illustrated in FIGS. 1-5, the motor stator 11 according to an embodiment of the present disclosure includes a stator core 111, a stator winding 112, and a lead-out wire 113 for coupling an external circuit and the stator winding 112.

The stator core 111 has a plurality of stator teeth 1112 spaced along its circumferential direction, and any adjacent two stator teeth 1112 define a stator slot 1113. The stator winding 112 is wound around the plurality of stator teeth 1112. The stator winding 112 includes a plurality of coil groups, each coil group having at least two connectors 1124. There is a plurality of lead-out wires 113. Each lead-out wire 113 is coupled to at least two connectors 1124 of the plurality of coil groups, and the at least two connectors 1124 coupled to each lead-out wire 113 are connectors 1124 from different coil groups.

Application conditions of a motor include that the rated voltage between terminals on which the motor is mounted is Un, the maximum outer diameter of the stator core 111 is Dmax, and the axial length of the stator core 111 is L, in which $Un/(Dmax^2 \times L) \leq 0.3$ V/cm$^3$.

For the motor stator 11 according to the embodiments of the present disclosure, in a case where the terminal voltage of the motor, the maximum outer diameter and the axial length of the stator core 111 satisfy the application range of the present disclosure, each lead-out wire 113 is coupled to at least two connectors 1124 from different coil groups, such that the coil diameter of the stator winding 112 can be decreased to improve the manufacturability of the stator winding 112 and increase the space factor of the motor, and at the same time, the AC resistance of the stator winding 112 can be decreased to reduce the skin effect and improve the efficiency of the motor.

Optionally, the number of coil groups is equal to the number of lead-out wires 113. For example, when the stator winding includes three coil groups, there are three lead-out wires.

In some examples, the stator winding 112 is coupled in a manner without any neutral point. For example, the stator winding 112 can be coupled in a delta connection, which simplifies the connection process of the stator winding 112 and the lead-out wires 113. On the premise of ensuring the same voltage and current characteristics of the motor, the coil diameter of the stator winding 112 can be appropriately reduced, thereby improving the manufacturability of the stator winding 112 to decrease the direct material cost and manufacturing cost of the stator winding 112, and also reducing the skin effect and lowering the AC resistance of the stator winding to enhance the efficiency of the motor.

According to some embodiments of the present disclosure, the stator winding 112 is a concentrated winding.

Figure 2:
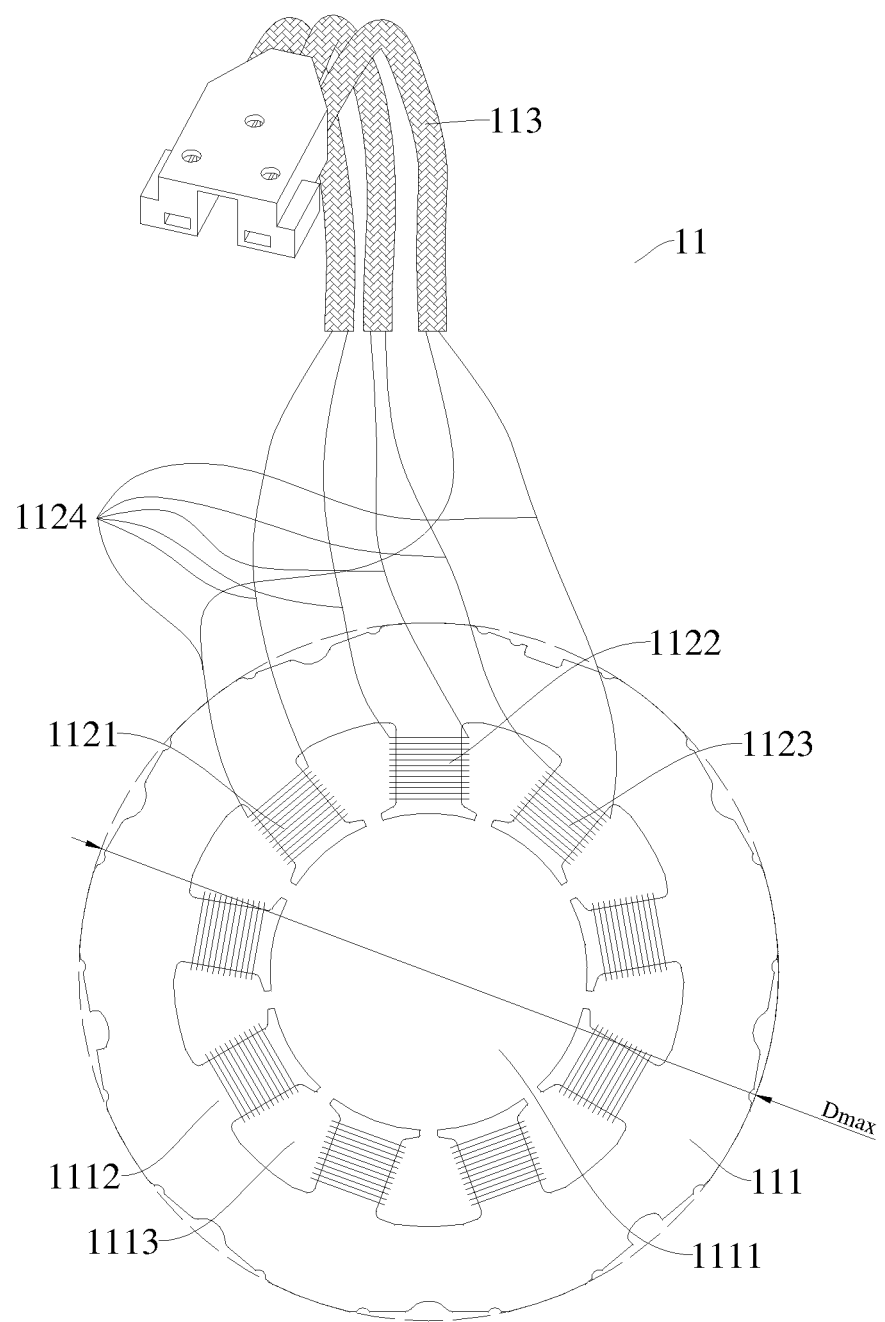
FIG. 2 illustrates a top view of the motor stator in FIG. 1.
Figure 3:
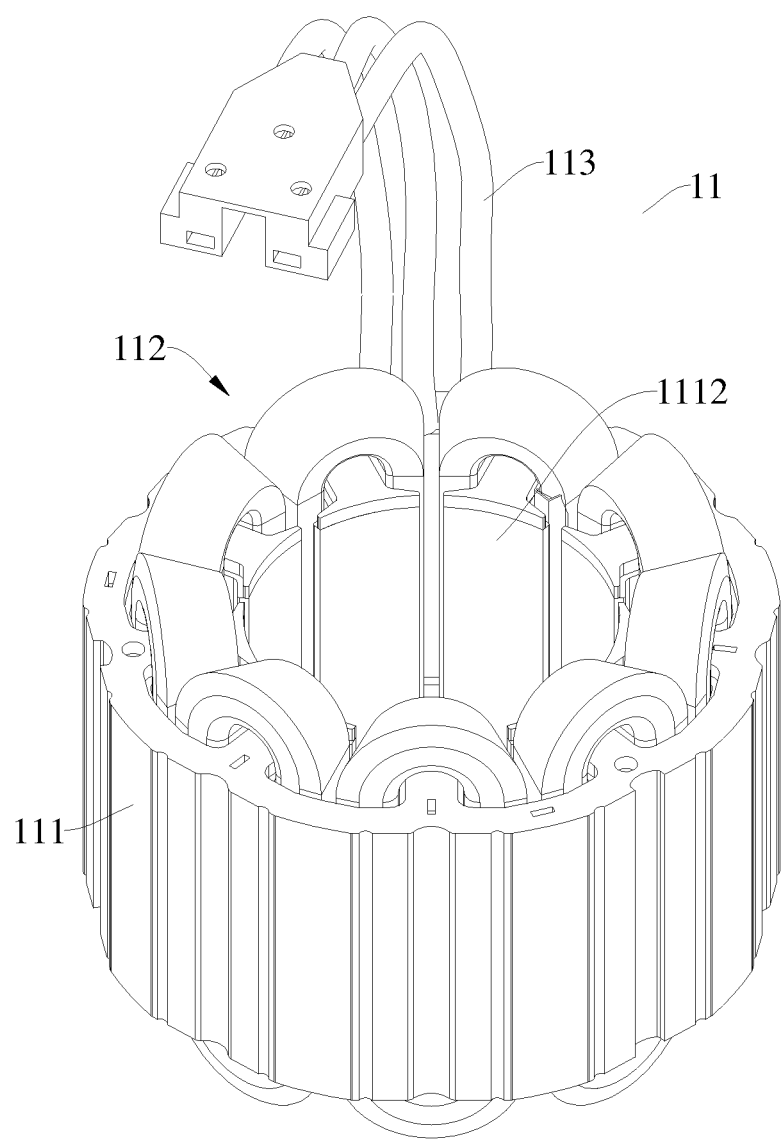
FIG. 3 illustrates a perspective view of the motor stator in FIG. 1.

Specifically, as shown in FIGS. 1-3, in the present embodiment, the stator winding 112 includes a first coil group 1121, a second coil group 1122, and a third coil group 1123, and there are three lead-out wires 113.

In some examples, each coil group has two connectors 1124. The first lead-out wire 113 is coupled to one connector 1124 of the first coil group 1121 and one connector 1124 of the second coil group 1122. The second lead-out wire 113 is coupled to the other connector 1124 of the first coil group 1121 and one connector 1124 of the third coil group 1123. The third lead-out wire 113 is coupled to the other connector 1124 of the second coil group 1122 and the other connector 1124 of the third coil group 1123.

That is, the stator winding 112 includes three coil groups, and each coil group includes two connectors 1124, i.e., the stator winding 112 has six connectors 1124 in total. Six connectors 1124 are coupled to three lead-out wires 113, each lead-out wire 113 is coupled to two connectors 1124, and the connectors 1124 to which each lead-out wire 113 is coupled are from different coil groups.

In the present embodiment, the application conditions of the motor include that the rated voltage between motor terminals is Un, the maximum outer diameter of the stator is Dmax, and the axial length of the stator is L, in which $Un/(Dmax^2 \times L) \leq 0.3$ V/cm$^3$. In a situation satisfying the aforementioned application conditions, the use of the motor stator 11 of the present disclosure can effectively decrease the conductor diameter of the stator winding 112, thereby improving the manufacturability of the stator winding 112. In addition, since the conductor diameter of the stator winding 112 is decreased, it is advantageous to reducing the skin effect of the conductor, thereby reducing the AC resistance of the motor and improving the performance of the motor.

In some examples, the number of stator slots 1113 is a multiple of three.

In some specific examples, the stator core 111 of the motor stator 11 for the compressor has nine stator slots 1113 and nine stator teeth 1112. The stator winding 112 is divided into three coil groups, each coil group has two connectors 1124, and the connectors 1124 from different coil groups are in pairs to be coupled with the lead-out wire 113.

Certainly, the number of connectors 1124 of each coil group according to the present disclosure is not limited to two.

In some specific examples, the number of connectors 1124 of each coil group may be an even number (2n, n=1, 2, 3, . . . ). If the stator winding 112 has m coil groups, the total number of the connectors 1124 of the stator winding 112 is 2mn.

The first lead-out wire 113 may be coupled to the n connectors of the first coil group 1121 and the n connectors of the second coil group 1122; the second lead-out wire 113 may be coupled to the other n connectors of the first coil group 1121 and the n connectors of the third coil group 1123; and the third lead-out wire 113 can be coupled to the other n connectors of the second coil group 1122 and the other n connectors of the third coil group 1123.

As shown in FIG. 3, in some examples, the motor stator 11 further includes an insulating material to electrically insulate the stator winding 112 from the stator core 111 and stator windings 112 of different phases.

Figure 4:
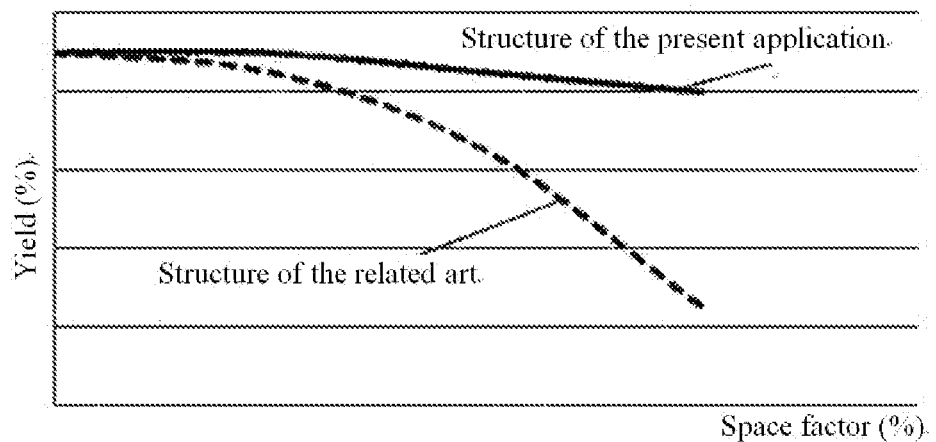
FIG. 4 illustrates a contrast diagram of winding yield of a motor stator for a compressor according to embodiments of the present disclosure and a stator in the related art.

FIG. 4 is a contrast diagram showing the winding yield of the motor stator 11 of the above-described embodiment and a stator in the related art.

It can be seen that in the related art, in a situation where the conductor cross-section of the stator winding is relatively large, it is difficult for the stator winding to achieve a high space factor, and if the space factor exceeds a certain critical point, the manufacturing yield may drop sharply with the increase of the space factor, and the manufacturing may even become impossible.

In contrast, the structure of the motor stator 11 according to the embodiments of the present disclosure can effectively reduce the conductor diameter of the stator winding 112 on the one hand, thereby making it easier to achieve a higher space factor of the stator winding 112. On the other hand, as wire diameter of the conductor increases, the AC resistance/DC resistance of the conductor will increase due to the skin effect, which degrades the performance of the motor.

According to other optional embodiments of the present disclosure, the stator winding 112 is a distributed winding.

Figure 5:
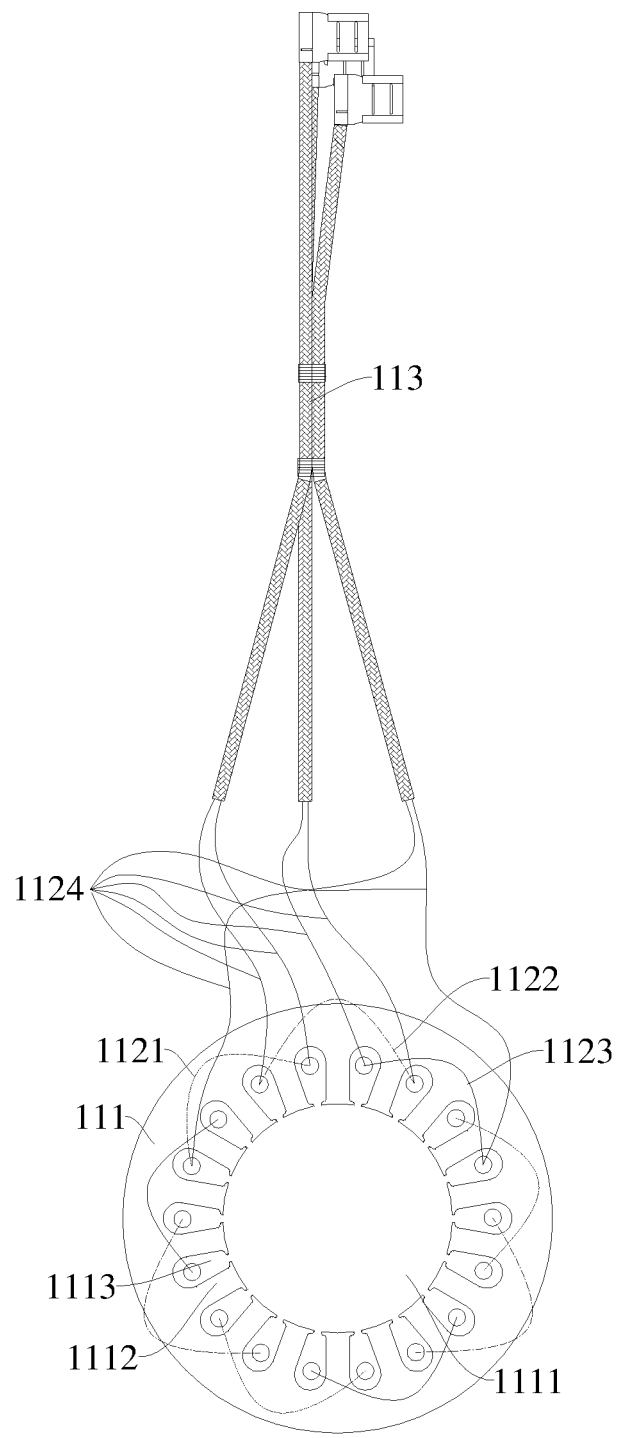
FIG. 5 illustrates a schematic view of a motor stator for a compressor according to another embodiment of the present disclosure.

As shown in FIG. 5, in some examples, the stator core 111 has eighteen stator slots 1113 and eighteen stator teeth 1112. In a case where the terminal voltage of the motor, the maximum outer diameter and the axial length of the stator core 111 satisfy the application range of the present disclosure, the connection method of the connector 1124 of the stator winding 112 and the lead-out wire 113 according to the present disclosure brings about similar excellent effects.

In some optional examples, one end of the lead-out wire 113 is coupled with a junction box, and the lead-out wire 113 is coupled to the external circuit through the junction box. In other optional examples, one end of the lead-out wire 113 is coupled with a conductive insert, and the lead-out wire 113 is coupled to the external circuit through the conductive insert, which is convenient to connect and easy to operate.

For the motor stator 11 according to the embodiments of the present disclosure, the coils of the stator winding 112 can be simply coupled to the lead-out wire 113, and the manufacturability of the motor can improved while the same voltage and current characteristics of the motor are ensured. In addition, considering that a large conductor cross-sectional size of the stator winding 112 may tend to produce the skin effect, resulting in decrease of the motor efficiency, the motor stator 11 according to the embodiments of the present disclosure can reduce the conductor cross-sectional size of the stator winding 112, thereby reducing the skin effect of the conductor and enhancing the motor efficiency.

Figure 6:
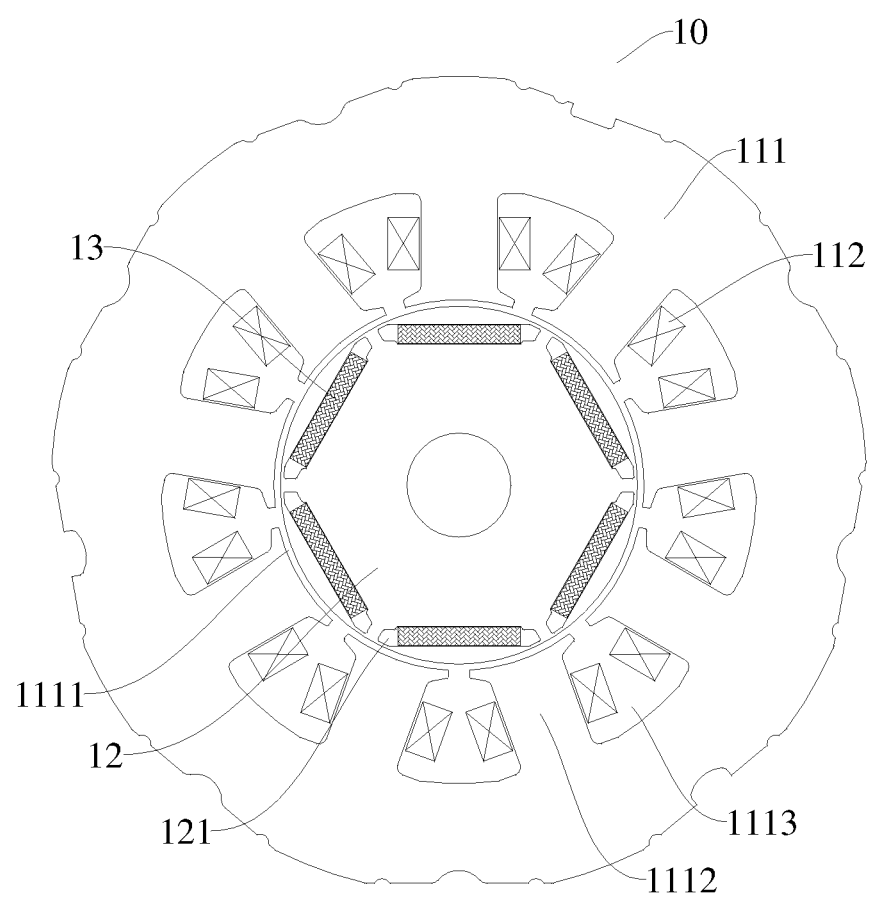
FIG. 6 illustrates a schematic view of a permanent magnet motor according to embodiments of the present disclosure.
Figure 7:
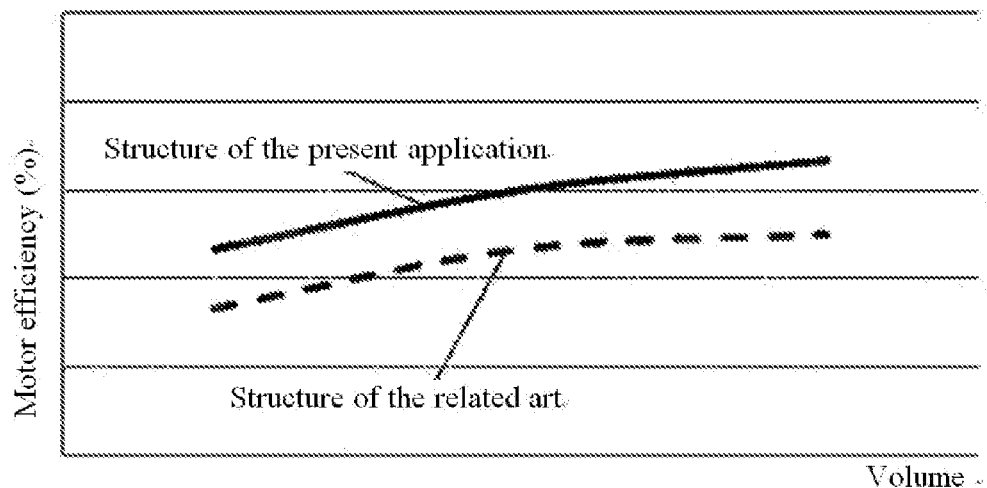
FIG. 7 illustrates a contrast diagram of efficiency-volume of a permanent magnet motor according to embodiments of the present disclosure and a motor in the related art.
Figure 8:
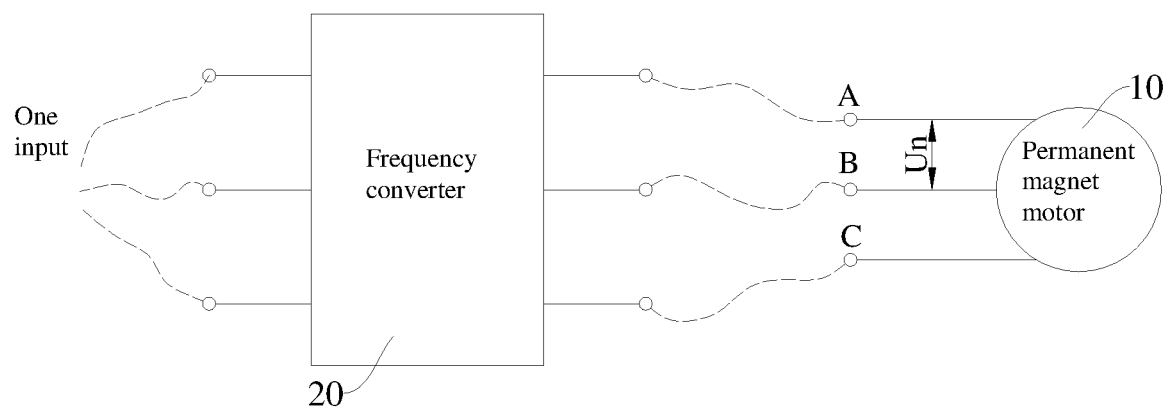
FIG. 8 illustrates connection between a permanent magnet motor according to embodiments of the present disclosure and a frequency converter.

As illustrated in FIGS. 6-8, a permanent magnet motor 10 according to embodiments of a second aspect of the present disclosure includes a rotor and the motor stator 11 according to the above embodiments.

Since the motor stator 11 according to the above embodiments of the present disclosure has the above technical effects, the permanent magnet motor 10 according to embodiments of the present disclosure also has the above technical effects, that is, the structure of the permanent magnet motor 10 is simple, the direct material cost and manufacturing cost are low, the permanent magnet motor 10 is easy to process and manufacture and has a high yield, good operation efficiency and excellent performance As illustrated in FIG. 6, in some examples, the stator core 111 has a passage 1111 in the center thereof, and the rotor is rotatably provided in the passage 1111.

The rotor includes a rotor core 12 and a plurality of permanent magnets 13. The rotor core 12 has a plurality of magnet groove 121 spaced apart in a circumferential direction thereof. The plurality of permanent magnets 13 is disposed in the plurality of magnet grooves 121 correspondingly. The number of pole pairs of the rotor is P, the number of stator slots 1113 is Z, and the relationship is satisfied: $Z/P=3/2^k$, wherein k is a positive integer. For example, if the number Z of the stator slots 1113 is nine, the number P of pole pairs of the rotor may be six.

FIG. 7 is a contrast diagram showing the efficiency-volume of the permanent magnet motor 10 according to embodiments of the present disclosure and a motor in the related art.

It can be seen that the stator of the permanent magnet motor 10 according to the embodiments of the present disclosure has a high space factor while the skin effect is reduced due to the small conductor cross-sectional area of the stator winding 112. As a result, under different volumes, the motor according to the present disclosure has better performance compared with the motor structure in the related art.

As shown in FIG. 8, according to an embodiment of the present disclosure, the permanent magnet motor 10 is powered by a frequency converter 20. The input side of the frequency converter 20 may be direct current or alternating current. The output side of the frequency converter 20 is coupled to the permanent magnet motor 10 to supply power to the permanent magnet motor 10, thereby realizing the variable frequency control over the permanent magnet motor 10.

A compressor A according to embodiments of a third aspect of the present disclosure includes the above permanent magnet motor 10 according to the above embodiments. Since the permanent magnet motor 10 according to the above embodiments of the present disclosure has the above technical effects, the compressor A according to the embodiments of the present disclosure also has the above technical effects, that is, the compressor A is easy to process and manufacture and has high operation efficiency.

Figure 9:
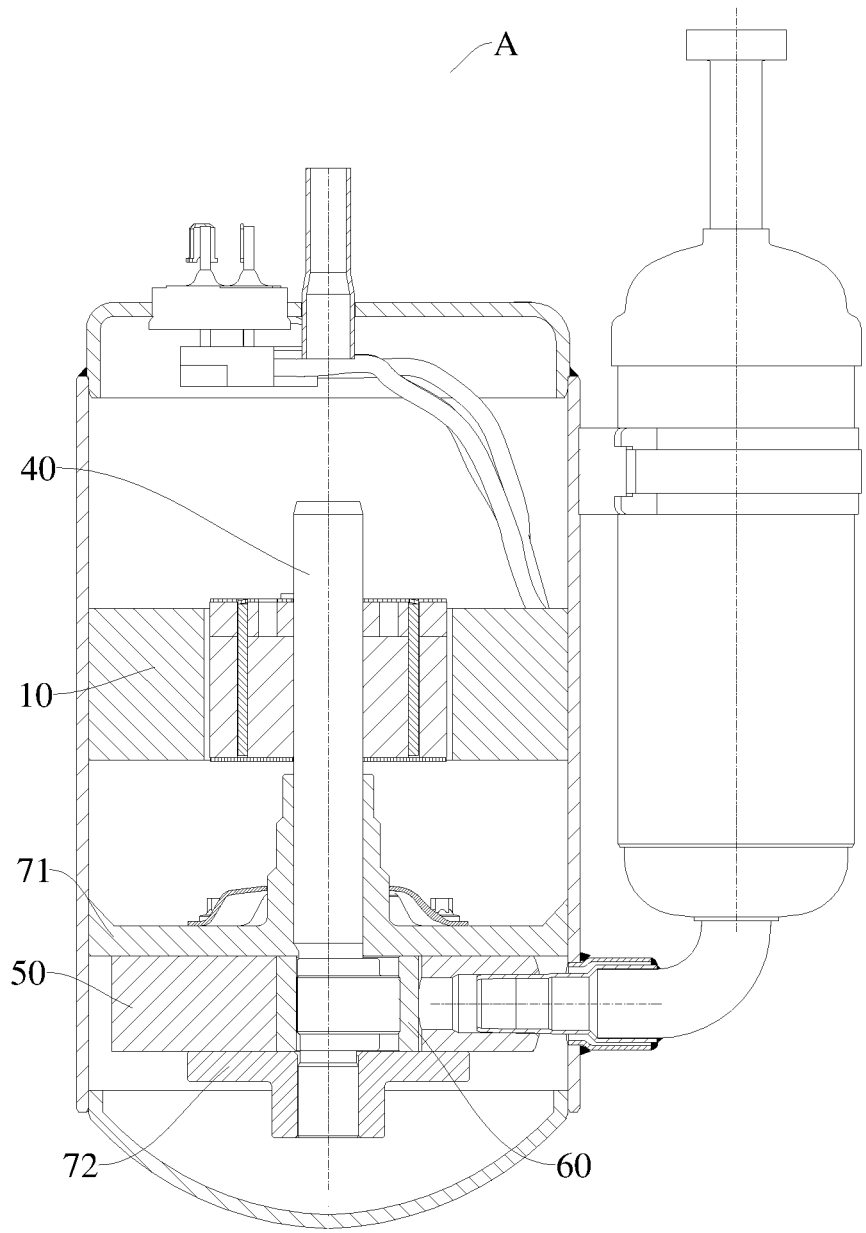
FIG. 9 illustrates a schematic view of a compressor according to embodiments of the present disclosure.

As illustrated in FIG. 9, according to an embodiment of the present disclosure, the compressor A includes a housing 30, a crankshaft 40, a cylinder 50, a piston 60, a main bearing 71, an auxiliary bearing 72, and the motor in the above embodiments.

The housing 30 extends in a vertical direction (an up-and-down direction as shown in FIG. 9), and the housing 30 defines a receiving cavity extending in its axial direction. The crankshaft 40 is disposed within the receiving cavity and arranged along the axial direction of the housing 30. A lower end of the crankshaft 40 passes through the cylinder 50. The main bearing 71 and the auxiliary bearing 72 are disposed at upper and lower ends of the cylinder 50 respectively to define together with the cylinder 50 a sealed compression chamber. The portion of the crankshaft 40 that extends into the cylinder 50 forms an eccentric portion and the piston 60 is fitted over the eccentric portion. An upper end of the crankshaft 40 is coupled to the rotor core 12 of the motor.

Other configurations and operations of the motor and the compressor A in accordance with embodiments of the present disclosure are known to those of ordinary skill in the art and will not be described in detail herein.

Reference throughout this specification to "an embodiment," "some embodiments," "an exemplary embodiment", "an example," "a specific example," or "some examples," means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be appreciated by those skilled in the art that any changes, modifications, alternatives and variations can be made in the embodiments without departing from principles and purposes of the present disclosure. The scope of the present disclosure is defined by the claims and the equivalents thereof.

What is claimed is:

1. A motor stator comprising:
a stator core comprising a plurality of stator teeth spaced along a circumferential direction of the stator core, wherein any adjacent two stator teeth define a stator slot;
a stator winding comprising at least three coil groups, wherein each coil group is wound around a corresponding stator tooth of the plurality of stator teeth, and wherein each coil group of the plurality of coil groups comprises at least two connectors; and
a number of lead-out wires equal to or greater than the at least three coil groups and configured to couple an external circuit and the stator winding,
wherein each lead-out wire is separately coupled with at least two connectors, each of the at least two connectors being from a different one of the coil groups, each coil group being connected to only two of the lead-out wires,
wherein each lead-out wire is configured to be separately coupled directly to a corresponding output of a frequency converter such that each coil group is electrically connected to two of the outputs of the frequency converter via the corresponding two lead-out wires; and
wherein the motor stator satisfies the following relationship:

$$Un/(Dmax^2 \times L) \leq 0.3 \text{ V/cm}^3,$$

where Un is a rated voltage between terminals on which a motor including the motor stator is mounted,
where Dmax is a maximum outer diameter of the stator core, and
where L is an axial length of the stator core.

2. The motor stator according to claim 1, wherein the number of coil groups is equal to the number of lead-out wires.

3. The motor stator according to claim 1, wherein the coil groups comprises a first coil group, a second coil group, and a third coil group, and wherein the lead-out wires comprises three lead-out wires.

4. The motor stator according to claim 3, wherein each coil group has 2n connectors, n being a positive integer,
wherein a first lead-out wire is coupled to n connector or connectors of the first coil group and n connector or connectors of the second coil group,
wherein a second lead-out wire is coupled to other n connector or connectors of the first coil group and n connector or connectors of the third coil group, and
wherein a third lead-out wire is coupled to other n connector or connectors of the second coil group and other n connector or connectors of the third coil group.

5. The motor stator according to claim 1, wherein the stator winding is a concentrated winding or a distributed winding.

6. The motor stator according to claim 1, wherein the stator winding is coupled in a manner without any neutral point.

7. The motor stator according to claim 1, wherein the lead-out wires are coupled to the external circuit through a junction box or a conductive insert.

8. The motor stator according to claim 1, wherein the number of stator slots is a multiple of three.

9. A permanent magnet motor comprising:
a rotor; and
a motor stator comprising:
a stator core comprising a plurality of stator teeth spaced along a circumferential direction of the stator core, wherein any adjacent two stator teeth define a stator slot;
a stator winding comprising at least three coil groups, wherein each coil group is wound around a corresponding stator tooth of the plurality of stator teeth, and
wherein each coil group comprises at least two connectors; and a number of lead-out wires equal to or greater than the at least three coil groups and configured to couple an external circuit and the stator winding, wherein each lead-out wire is separately coupled with at least two connectors, each of the at least two connectors being from a different one of the coil groups, each coil group being connected to only two of the lead-out wires, wherein each lead-out wire is configured to be separately coupled directly to a corresponding output of a frequency converter such that each coil group is electrically connected to two of the outputs of the frequency converter via the corresponding two lead-out wires; and wherein the motor stator satisfies the following relationship:

$Un/(D\max^2 \times L) \leq 0.3$ V/cm$^3$, where Un is a rated voltage between terminals on which a motor including the motor stator is mounted, where Dmax is a maximum outer diameter of the stator core, and where L is an axial length of the stator core.

10. The permanent magnet motor according to claim 9, wherein the rotor comprises:

a rotor core defining a plurality of magnet grooves; and
a plurality of permanent magnets, wherein each permanent magnet of the plurality of permanent magnets is provided in a corresponding magnet groove of the plurality of magnet grooves, and wherein the rotor satisfies the following relationship:

$Z/P = 3/2^k$, where P is the number of pole pairs of the rotor,
where Z is the number of the stator slots, and
where k is a positive integer.

11. The permanent magnet motor according to claim 9, wherein the permanent magnet motor is configured to be powered by a frequency converter.

12. A compressor comprising:
a permanent magnet motor comprising:
 a rotor; and
 a motor stator, the motor stator comprising:
  a stator core comprising a plurality of stator teeth spaced along a circumferential direction of the stator core, wherein any adjacent two stator teeth define a stator slot;
  a stator winding comprising at least three coil groups,
   wherein each coil group is wound around a corresponding stator tooth of the plurality of stator teeth, and
   wherein each coil group comprises at least two connectors; and
  a number of lead-out wires equal to or greater than the at least three coil groups and configured to couple an external circuit and the stator winding,
   wherein each lead-out wire is separately coupled with at least two connectors, each of the at least two connectors being from a different one of the coil groups, each coil group being connected to only two of the lead-out wires,
   wherein each lead-out wire of the plurality of lead out wires is configured to be separately coupled directly to a corresponding output of a frequency converter such that each coil group is electrically connected to two of the outputs of the frequency converter via the corresponding two lead-out wires; and
  wherein the motor stator satisfies the following relationship:

$Un/(D\max^2 \times L) \leq 0.3$ V/cm$^3$, where Un is a rated voltage between terminals on which a motor including the motor stator is mounted,
where Dmax is a maximum outer diameter of the stator core, and
where L is an axial length of the stator core.

* * * * *